Patented Dec. 13, 1949

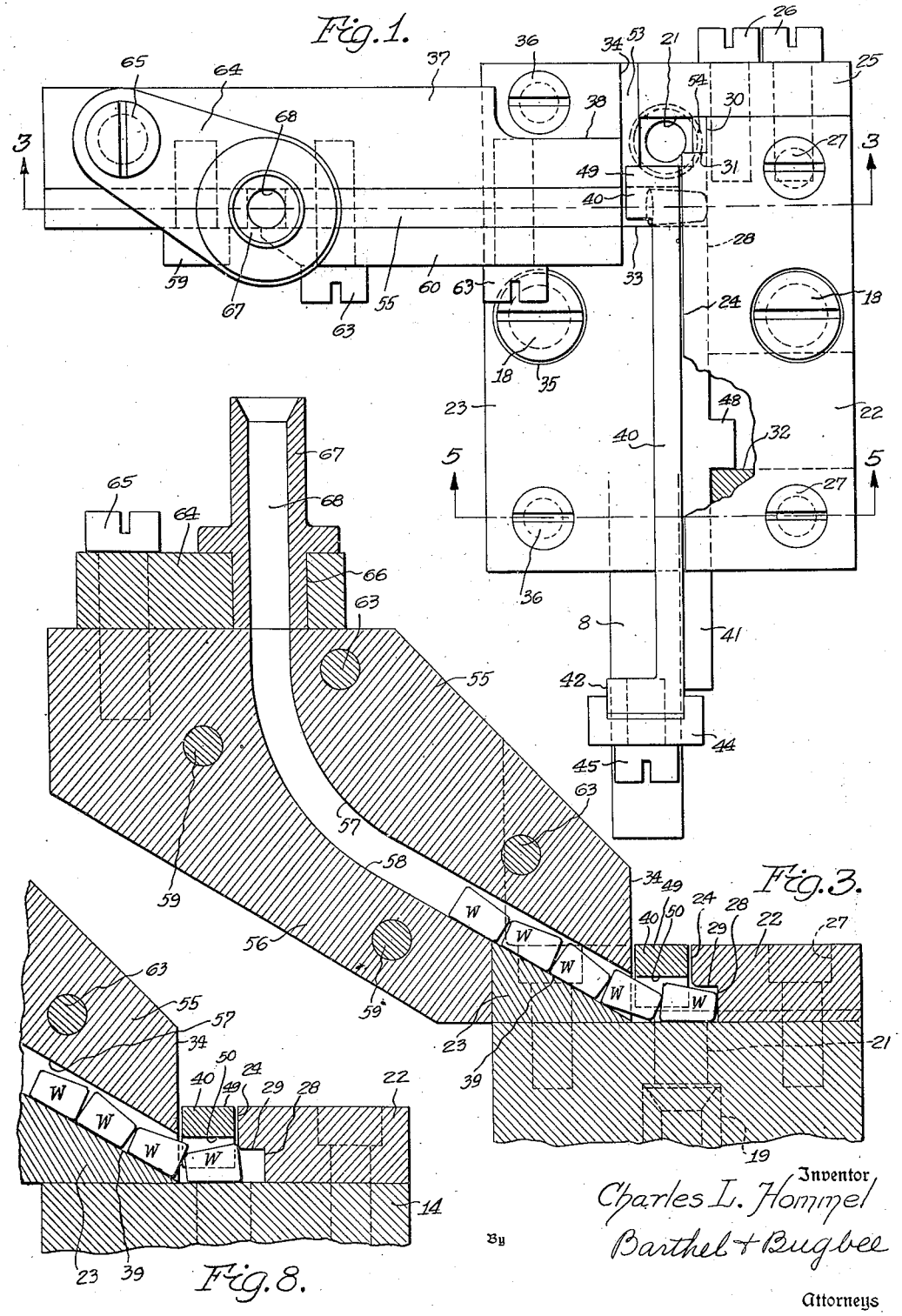
Dec. 13, 1949     C. L. HOMMEL     2,490,872
ARTICLE FEEDING APPARATUS
Filed June 4, 1945     4 Sheets-Sheet 1
Inventor
Charles L. Hommel
Barthel & Bugbee
Attorneys

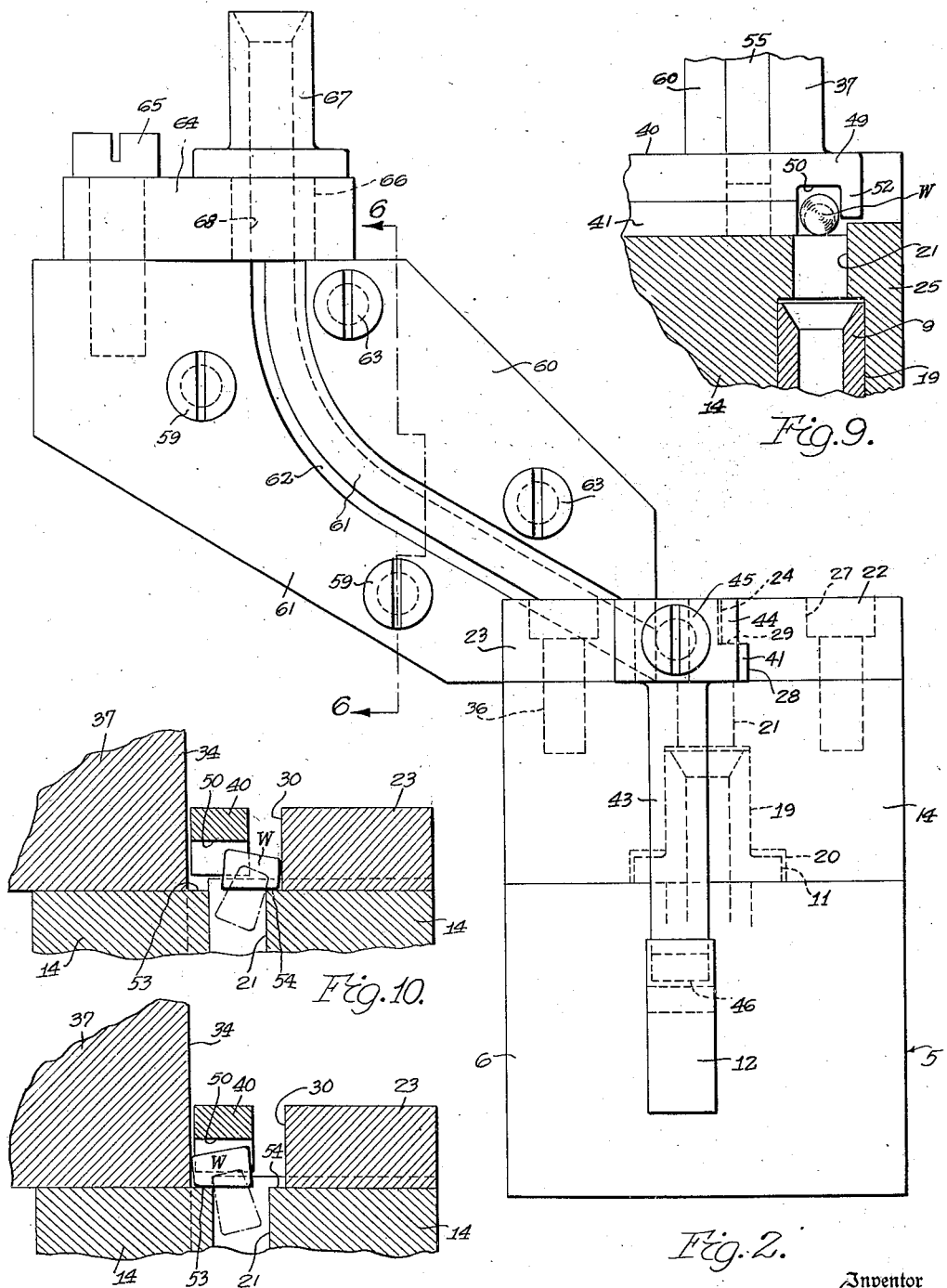

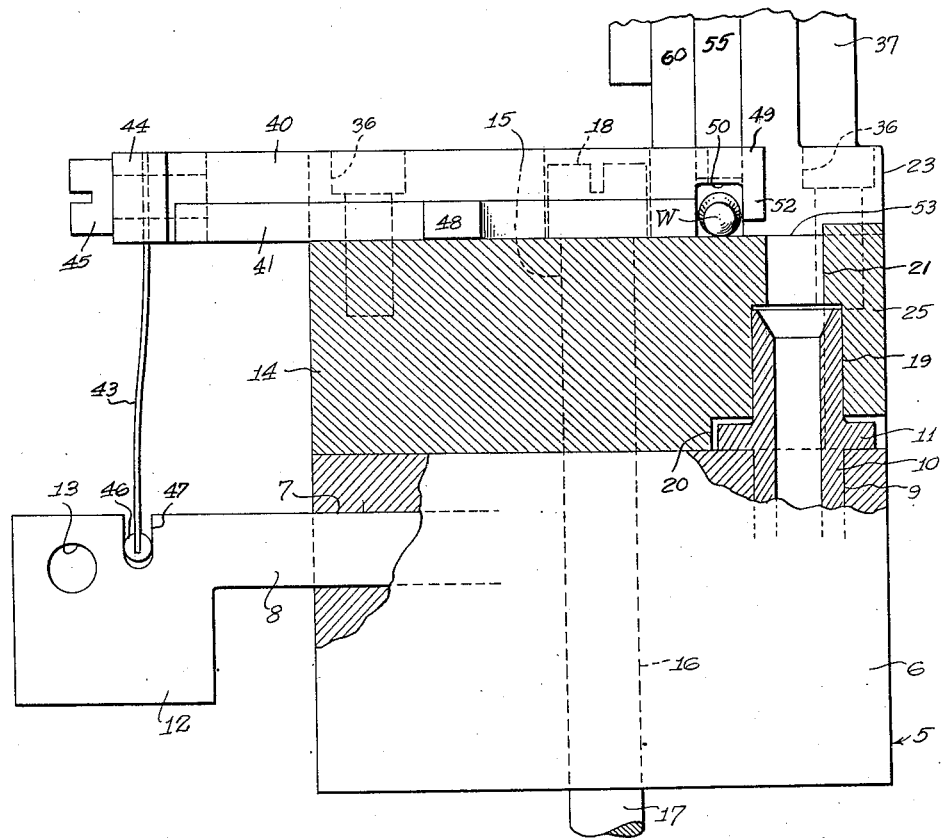

2,490,872

UNITED STATES PATENT OFFICE 2,490,872

ARTICLE FEEDING APPARATUS

Charles L. Hommel, Detroit, Mich., assignor to Bower Roller Bearing Company, Detroit, Mich., a corporation of Michigan Application June 4, 1945, Serial No. 597,389

6 Claims. (Cl. 193—43)

The present invention relates to article handling and feeding apparatus for delivering relatively small tapered work pieces of round section to assorting and gauging apparatus.

The primary object of the invention is to provide an apparatus for delivering and feeding work pieces such as bearing rollers which are tapered and of round section to an assorting and gauging machine or other processing device so that the work pieces or bearing rollers will be uniformly arranged with either their larger ends uppermost or their larger ends lowermost before being deposited in the gauging and assorting apparatus or other processing device.

Another object of the invention is to provide an apparatus for delivering and feeding work pieces such as bearing rollers which are tapered and of round section to an assorting and gauging machine or other processing device so that the work pieces or bearing rollers will be uniformly arranged with their tapered or smaller ends uppermost and their larger ends lowermost before being deposited in the gauging and assorting apparatus or other processing device.

Another object of the invention is to provide an apparatus for handling tapered work pieces and the like having a low center of gravity so that the work pieces will be intermittently delivered to the assorting and gauging apparatus in a uniform manner with their smaller ends uppermost and their larger ends lowermost, whereupon the work pieces will be properly positioned and arranged before being deposited on the rotary carrier of an assorting and gauging machine or other processing device.

Another object of the invention is to provide an apparatus for handling tapered work pieces and the like so that the work pieces will be intermittently delivered to the assorting and gauging apparatus in a uniform manner with their larger ends uppermost and their smaller ends lowermost, whereupon the work pieces will be properly positioned and arranged before being deposited on the rotary carrier of an assorting and gauging machine or other device.

Another object of the invention is to provide an article handling and feeding mechanism for intermittently delivering round tapered pieces or roller bearing elements to an assorting and gauging apparatus so that the work pieces will fall by gravity with their center of gravity lowermost onto a support for being deposited on the rotary carrier of the assorting and gauging apparatus in timed relation to the intermittent feeding of said work pieces.

Another object of the invention is to provide an apparatus for feeding and delivering work pieces having a low center of gravity to an assorting and gauging machine or the like in such a manner that the work pieces will be uniformly arranged and intermittently fed one at a time in the path of a reciprocating plunger so that the work pieces will finally come to rest on the rotary carrier of said assorting and gauging machine with their center of gravity lowermost.

Another object of the invention is to provide an article handling apparatus for delivering tapered work pieces of round section to an assorting and gauging apparatus or the like in which the work pieces are placed in a chute at random and fed by gravity to the handling apparatus so that the articles will finally come to rest on a platform in such a manner as to be properly positioned with either their larger or smaller ends arranged foremost for passage through a discharge opening prior to being fed to the rotary carrier of said assorting and gauging apparatus.

Other objects and advantages of the invention will become apparent during the course of the following description of the accompanying drawings, wherein:

Figure 1 is a top elevational view of the article handling and feeding mechanism showing the general arrangement and the various cooperating parts;

Figure 2 is a side elevational view showing the manner in which the inclined chute is arranged for receiving a series of tapered work pieces of round section so as to feed work pieces to the handling apparatus;

Figure 3 is a vertical cross-sectional view taken on line 3—3 of Figure 1 looking in the direction of the arrows showing the manner in which the work pieces are fed to the handling apparatus for being fed to the rotary carrier of an assorting and gauging machine with the smaller end of the work piece uppermost and the larger end lowermost;

Figure 4 is a front elevational view of the work piece handling apparatus showing portions thereof broken away to illustrate in detail the manner in which the work pieces are shifted to a discharge opening for being fed to an assorting and gauging apparatus;

Figure 5 is a vertical cross-sectional view taken on the line 5—5 of Figure 1 looking in the direction of the arrows and showing various details of the movable slide member for handling the work pieces and positioning the same so that they will be discharged with their center of gravity lowermost;

Figure 6 is a vertical cross-sectional view taken on line 6—6 of Figure 2 looking in the direction of the arrows and showing various details of construction of the feed chute for conveying the work pieces from a suitable hopper to the article handling apparatus;

Figure 7 is a fragmentary top elevational view of the movable slide member showing the manner in which the work pieces are intermittently fed or moved from the feed chute to a discharge opening so that the work pieces will fall through said discharge chute with their center of gravity lowermost;

Figure 8 is a vertical cross-sectional view similar to Figure 3 showing the manner in which the work pieces arrange themselves with respect to the handling apparatus when the larger end of the work piece passes downwardly foremost through the feed chute;

Figure 9 is a vertical cross-sectional view through the base portion of the article handling apparatus showing the manner in which the work pieces are intermittently conveyed from the feed chute to the discharge opening so as to fall downwardly therethrough by gravity with their center of gravity lowermost;

Figure 10 is a vertical cross-sectional view similar to Figure 3 showing a fragmentary portion of the article handling apparatus and further illustrating the manner in which the work pieces arrange themselves when fed downwardly through said feed chute with the smaller end foremost so that they will pass through the discharge opening and fall therethrough by gravity;

Figure 11 is a fragmentary vertical cross-sectional view similar to Figure 10 showing the manner in which the work pieces arrange themselves when fed downwardly through the feed chute with the large end foremost so that they will fall through the discharge opening with their center of gravity lowermost;

Figure 12:
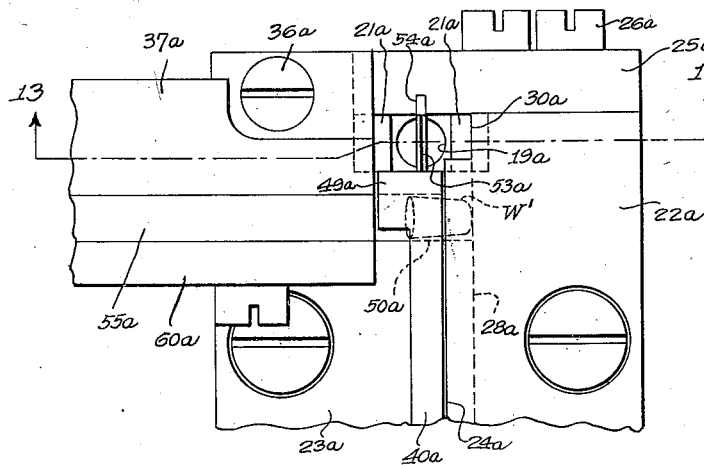
Figure 12 is a fragmentary top elevational view of a modified form of the invention in which the apparatus is so arranged that the articles will fall by gravity through the discharge passageway with their smaller ends foremost.
Figure 13:
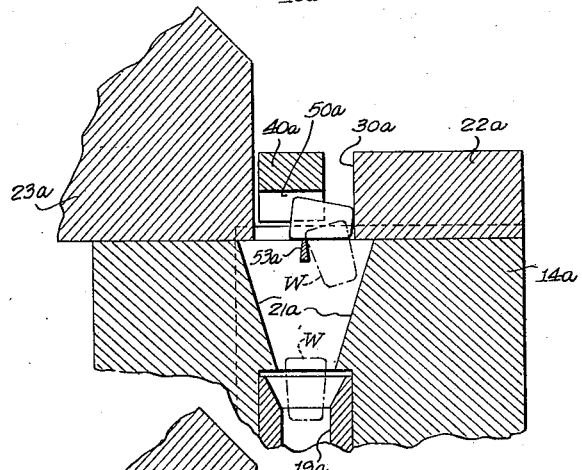
Figure 14:
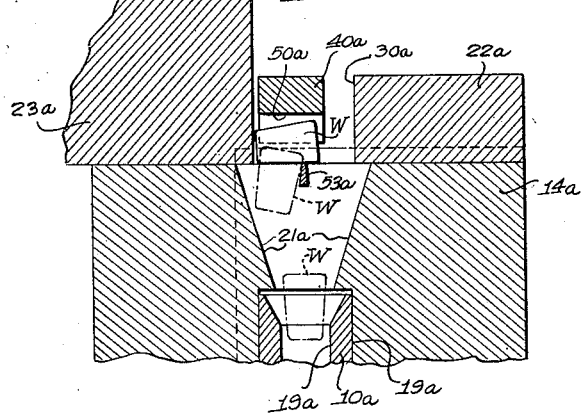

Figure 13 is a vertical cross-sectional view taken on line 13—13 of Figure 12 looking in the direction of the arrows and illustrating the manner in which the structure is arranged for feeding tapered work pieces of round section with their smaller ends foremost when the work piece is discharged from the chute with its small end foremost; and Figure 14 is a vertical cross-sectional view similar to Figure 13 showing the manner in which the work pieces are tilted so that they will fall by gravity with their smaller ends foremost through the discharge opening when they are fed from the chute to the pathway with their large ends foremost.

Brief description of the invention

Briefly, the invention comprises an apparatus for handling relatively small work pieces which are tapered and of round section, in such a manner that the work pieces will be fed to the rotary carrier of an assorting and gauging machine where they are gauged for size and sorted while being revolved around a circular pathway having adjustable gauge detents projecting into the pathway.

The work pieces, such as tapered bearing rollers, are placed in a hopper supported above the handling apparatus so that the work pieces will fall into an inclined chute and pass downwardly to an intermittent feed bar having a notch therein of sufficient size to receive the work pieces regardless of whether they are fed with the small or large end foremost. In the event that the roller bearings or work pieces are fed through an inclined feed chute with their smaller end foremost, the work piece passes to one side of the intermittent feed bar so that the small end thereof will rest upon a ledge and be partially supported thereby while being moved to the discharge opening. When the intermittent feed bar has been moved to the limit of its stroke in one direction so that the notch therein is disposed over the discharge opening, the bearing roller or work piece will fall by gravity through the discharge opening with its larger end lowermost.

In the event that the work pieces are fed downwardly through the feed chute with their large end foremost, the work piece will pass into the notch or recess on the under side of the intermittent feed bar but will be restricted by the large end engaging a shoulder on one side of the intermittent feed bar in such a manner that the small end will rest upon a ledge on the other side of the discharge opening where, upon movement of the slide bar to a position such that the notch in the under side thereof is in registry with the discharge opening, the work piece will fall by gravity through the discharge opening likewise with its center of gravity lowermost.

The work pieces or roller bearings pass downwardly through the discharge opening to a platform upon which they finally come to rest so that they may be projected onto a rotary carrier by means of a reciprocating pusher bar which operates in timed relation to the intermittent feed bar.

Detailed description of the invention

In the drawings, the reference character 5 will generally be employed to indicate a base or support for the article handling apparatus and said base is of rectangular shape and is adapted to be connected to or form a part of an assorting and gauging apparatus (not shown) having a rotatable carrier for receiving the work pieces and move the same about a circular pathway around which are arranged at circumferentially spaced apart positions gauging detents for removing the work pieces from the carrier according to their dimensional size. The assorting and gauging apparatus forms no part of this invention and is mentioned for the purpose of illustrating the manner in which the article handling apparatus may be used. The block or support 5 is formed of a piece of metal or casting 6 and is provided with a slideway 7 having a reciprocating pusher bar 8. The slideway 7 communicates with a vertical passageway 9 in which is fitted a sleeve 10 having an annular flange 11 adapted to rest upon the top wall of the metal block or support 6 for receiving and guiding the work pieces upon a suitable platform or the bottom wall of the slideway 7 in front of the inner end of the pusher bar 8 in such a manner that the pusher bar will project the work pieces from one end of the metal support or block 6 onto the rotary carrier of the gauging and assorting apparatus.

The pusher bar 8 is provided with an enlarged end portion 12 having an opening 13 to facilitate attachment thereto of a reciprocating link connected to a cam track or other mechanical movement device for converting rotary to reciprocating motion.

Mounted on the supporting block 6 is the base 14 of the article handling apparatus and said base is rectangular in shape and is provided with vertical passageways or openings 15 which are adapted to register with openings 16 in the base or support 6 for receiving anchoring bolts 17 having heads 18 suitably kerfed to receive a tool so that the threaded ends of the anchoring bolts 17 may be turned home in a boss or other projection on the assorting and gauging apparatus so as to securely hold the handling apparatus in place.

One end of the base 14 is provided with a vertical bore 19 for receiving the upper end of the tubular sleeve 10 and said bore is enlarged as at 20 for receiving the flanged portion 11 thereof as illustrated in Figure 4. The upper end of the bore 19 is reduced and squared as at 21 and is of sufficient size to permit the passage therethrough of a work piece, endwise.

Affixed to the top wall of the base or block 14 is a pair of elongated plates 22 and 23 which are arranged in spaced parallel relation to form therebetween a groove 24. The plate 22 terminates adjacent one end of the block in spaced relation therefrom and is adapted to abut an end wall or plate 25 projecting upwardly from the end portion of the block 14 and secured thereto by machine screws 26 which extend inwardly from the sides of the block 25 and are received in threaded openings in the end wall of the supporting block 14. Machine screws 27 pass through suitable openings at each end of the plate 22 and are threaded in suitable openings extending downwardly into the supporting block 14 so that the threaded ends thereof will be received in threaded openings 28a.

The inner edge of the plate 22 is undercut to provide a wall surface 28 and a horizontal wall surface 29, and one end of the plate 22 is cut away at the corner portion thereof as at 30 and 31. The under side of the plate 22 is cut away to form a recess 32 between the plate 22 and the top surface of the supporting block 14.

The plate 23 is similar in construction to the plate 22 except that it extends the entire length of the block 14 and has one corner thereof cut away as at 33 and 34. An opening 35 is formed in the plate 23 to permit the plate to be secured to the block 14 and held in place by machine screws 36 extending into threaded openings in the top wall of the block 14. Formed integral with the plate 23 is a laterally inclined projection 37 which is cut away as at 38 to facilitate positioning of the machine screw 36. The laterally and obliquely extending portion 37 of the plate 23 is adapted to form an inclined chute or passageway for feeding the work pieces in a manner which will be hereinafter more fully described. In addition, the plate 23 is provided with an inclined surface 39 on one side of the vertical wall of the obliquely and laterally extending portion 37 to form a continuation of the chute so as to feed the work pieces to the area between the inner edge of the plate 22 and the cut out corner 33, 34 of the plate 23.

Slidably and reciprocably mounted in the slot 24 between the parallel spaced plates 22 and 23 is an intermittent feed bar 40 of L-shaped section and arranged with its flange 41 received in the undercut portion 28, 29 of the plate 22 so as to slide freely between said plates but yet be prevented from vertical displacement. One of the ends of the intermittent feed bar 40 is provided with a head 42 to which is secured a leaf spring 43 by means of a clamping plate 44 held in place by a machine screw or the like 45. The lower end of the leaf spring 43 is provided with a round bearing member 46 for reception in a transverse groove or slot 47 in the pusher bar 8. The intermediate end of the intermittent feed bar 40 is provided with a projection 48 extending into the recess 32 so as to limit the to and fro movement of the intermittent feed bar 40 upon operation of the pusher bar 8. It will thus be seen that reciprocation of the pusher bar 8 will likewise reciprocate the intermittent feed bar 40 by means of the yielding driving connection 43 therebetween to permit movement of the pusher bar 8 slightly in advance of the intermittent feed bar 40 in both directions of the reciprocating movement. The free end of the intermittent feed bar 40 is provided with a head 49 and the underside of the bar is notched to provide a recess therein as at 50. The head 49 has a depending wall portion 52 which terminates in spaced relation from the top surface of the block 14 (Figure 4) so as to pass over the top edge of the vertical plate 25 during reciprocatory to and fro movement of the intermittent feed bar 40. In one of the positions of the intermittent feed bar 40, the slot or groove 50 is adapted to register with the inclined surface 39 formed in the plate 23 (Figure 4) and in the other position, the recess or groove 50 is adapted to register with the discharge opening 21 in the block 14. The upper end of the discharge opening 21 is in registry with the sleeve 10. It will thus be seen that the squared edge of the opening 21 adjacent the vertical wall 34 of the plate 22 is so spaced as to provide a ledge 53, while the opposite wall of the squared opening 21 is spaced from the vertical wall 30 of the plate 22 so as to provide a ledge or shelf 54. The enlarged head 49 of the intermittent feed bar 40 forms a continuation of the recess or slot 50 on the underside of the intermittent feed bar on only one side thereof so that work pieces following the work pieces disposed beneath said notch will not interlock with the portion of the recess 50 beneath the laterally extending enlarged head 49.

The feed chute for the work pieces is of sectional structure to facilitate the varying of the size of the chute for accommodating work pieces of various diameters. Secured to one face of the laterally and obliquely extending projection 37 is a pair of movable plates 55 and 56 having mutually curved edge surfaces 57 and 58 respectively to form therebetween a passageway shaped as shown in Figure 3. The lowermost end of the plate 55 has its inner edge spaced from the inclined surface 39 formed in the plate 23 and the lowermost end of the plate 56 abuts the outer vertical wall of the plate 23 so that the curved surface 58 thereof will form a continuation of the inclined recess or groove 39 formed transversely in the plate 23. The lower plate 56 is secured to the upwardly and obliquely extending projection 37 by machine screws or the like as at 59 while the upper plate 55 is covered by means of a plate 60 shaped similar thereto and arranged with an overhanging edge 61 to extend beyond the curved surface 57 of the plate 55 and partially cover the arcuately curved passageway or chute 62 formed between the plates 55 and 56. The plates 55 and 60 are affixed to the upwardly extending oblique projection 37 by means of machine screws or the like as at 63 and the lower edge of the plate 56 is adapted to rest upon the top surface of the plate 23.

The upper end of the obliquely and laterally extending projection 37 as well as the upper ends of the plates 55, 56 and 60 are shaped to provide a horizontal platform for receiving a block 64 which is secured to the upwardly and laterally extending projection 37 by means of a machine screw as at 65, suitably threaded in a bore in the upwardly and obliquely extending projection 37. The block 64 is arranged so as to project over the arcuately curved chute or passageway 62 formed by the plates 55 and 56 and is provided with an opening therein as at 66 in registry with said arcuately curved passageway or chute 62. A bushing 67 is fitted in the opening 66 and has a bore 68 of substantially the same size as the arcuately curved chute or passageway 62 adapted to communicate with the discharge opening of a suitable hopper placed above and supported by the tubular bushing 67. The work pieces W may be contained in the hopper so as to feed the work pieces to the arcuately curved chute or passageway 62 shown best in Figure 3. As illustrated in the drawings, the work pieces W comprise tapered bearing rollers which are of round section and are adapted to assume various positions in the chute or passageway 62 when fed from the hopper (not shown) with which the tubular bushing or sleeve 67 is in communication. Thus it will be seen that the work pieces W will be fed to the arcuately curved chute 62 at random so that some of the work pieces will be disposed in the chute with their larger ends lowermost while others will be disposed with their smaller ends lowermost.

*Description of the operation of the invention*

In operation, the article handling apparatus is attached to an assorting and gauging machine as above described, by anchoring the blocks 6 and 14 thereto to a projection or other support on the casing of said assorting and gauging machine so that the pusher bar 8 will extend radially therefrom and the bore 7 will be arranged in registry with the charging opening in said gauging and assorting machine. Likewise, as mentioned above, the sleeve 67 is arranged within or supported by the discharge opening of a suitable hopper so that the work pieces will feed by gravity downwardly through the arcuately curved feed chute 62. If desired, the head 12 of the pusher bar 8 may be driven from a part of the assorting and gauging apparatus so as to reciprocate the pusher bar 8 in timed relation with circumferentially spaced platforms on the rotary carrier of the assorting and gauging machine.

With the article uprighting and handling apparatus arranged as above so as to set in motion the reciprocating pusher bar 8, and also the intermittent feed plunger 40, the work pieces W will fall by gravity into the recess 50 in the intermittent feed bar 40 when said feed bar is in the position shown in Figures 1, 3, 4 and 8. If the tapered articles are disposed with their smaller ends lowermost in the feed chute 62, they will pass beneath the notch 50 in the intermittent feed bar 40 so as to extend partially into the undercut portion of the plate 22 formed by the vertical and horizontal walls 28 and 29. The wall 29 of the undercut portion is spaced from the top surface of the block 14 a sufficient distance to allow the small end of the tapered work piece to pass thereneath as shown in Figures 1, 3, 4, 7 and 10. Upon horizontal movement of the intermittent feed bar 40 to the right from the position shown in Figure 4 to that shown in Figure 9, the small end of the work piece will rest upon the shelf or ledge portion 54 of the squared opening 21 in such a manner that the center of gravity overhangs said squared opening to cause the work piece to be tilted and fall by gravity with its enlarged end lowermost. The work piece falls upon the platform (not shown) which is a continuation of the slideway 7 and is then projected onto one of the circumferentially spaced platforms on the rotary carrier of the assorting and gauging apparatus. It is to be noted that the following work piece (Figure 3) will be retained against movement once the intermittent feed bar 40 is moved so as to position the notch 50 therein out of registry with the arcuately curved chute 62 and into registry with the squared opening 21.

When the work pieces arrange themselves between the arcuately curved chute 62 with their larger ends lowermost, they pass under the notched portion 50 of the intermittent feed bar 40 (Figures 8 and 11) so that the large end will engage the vertical wall or inner edge 24 forming one of the walls of the groove between the parallel spaced flights 22 and 23. It will thus be seen that the work pieces W are positioned so that horizontal movement of the intermittent feed bar 40 in the direction of the squared opening 21 in the block 14 will cause the smaller end of the work piece to rest upon the shelf or ledge 53 so that the smaller end of the work piece will be retained while the larger end will fall by gravity into the opening 21 and pass downwardly through the bushing or sleeve 9 onto the platform in advance of the pusher bar 8. The following work piece is arrested in the chute 62 by engaging the vertical wall of the intermittent feed plunger 40 so that when said feed plunger is returned to a position in which the notch 50 on the underside of the intermittent feed bar is in registry with the chute 62, at which time the following work piece will likewise pass beneath the notched portion 50 of the intermittent feed bar 40 and be deposited in the squared opening 21 of the supporting block 14 with the larger end lowermost so as to pass downwardly through the discharge opening 21 and sleeve 9 in an upright position for being projected onto one of the platforms of the rotary carrier of the assorting and gauging apparatus.

In order to adapt the apparatus to work pieces such as bearing rollers of various dimensions, the plates 55 and 56 may be removed and other plates substituted therefor of a greater or smaller thickness and with the mutually spaced curved surfaces 57 and 58 either closer together or further apart. Similarly, the bushings or sleeves 9 and 67 may be replaced by bushings having bores of various diameters so as to accomodate work pieces of various sizes and diameters and thereby insure that the work pieces will not tumble while passing through the tubular bushing as well as the inclined chute or passageway 62.

In the event that one of the bearing rollers or work pieces W becomes jammed, the pusher plunger 8 may continue to operate without causing material damage to the work handling apparatus or the drive mechanism therefor by reason of the yielding connection 43 between the pusher plunger 8 and the intermittent feed plunger 40.

*Description of modified form of invention shown in Figures 12 to 14*

In the modified form of the invention shown in Figures 12 to 14 inclusive, a supporting block 14a is provided on its top surface with a pair of spaced plates 22a and 23a which are fastened in place by suitable machine screws 36a similar to the plates 22 and 23 shown and described in the form of the invention in Figures 1 to 11 inclusive. The plates 22a and 23a have their inner edges spaced apart slightly and the edge 24a of the plate 22a is undercut to provide a vertical wall surface 28a extending upwardly from the block 14a. A horizontal wall portion connects the vertical wall portion 28a with the vertical edge wall portion 24a of the plate 22a. A plate 25a is affixed to the side of the block 14a by machine screws or the like as at 26a and the end of said plate extends beyond the edge 24a of the plate 22a to form an abutment wall. The plate 23a has formed integral therewith an upwardly angularly extending portion 37a to form a chute having plates 55a and 60a in identically the same manner as described in connection with the form of the invention shown in Figures 1 to 11 inclusive.

An intermittent feed bar 40a is formed with a flange extending laterally therefrom which is received in the undercut slot 28a of the plate 22a and said intermittent feed bar is provided with an enlarged head 49a to project laterally from one side of the groove 50a formed on the underside of said intermittent feed bar 40a, so that the work pieces W' will be fed from the chute 37a and pass within the recess 50a on the underside of the intermittent feed bar 40a. The end of the passageway between the spaced plates 22a and 23a is formed of a square opening having side wall portions 21a which taper downwardly and extend into the bore 19a fitted with a discharge tube 18a. The plate 22a is cut away as at 30a and the inclined side wall portions 21a are cut back under the plates 22a and 23a. Extending across the rectangular opening formed by the inclined side walls 21a is a bar 53a having one end anchored in a recess 54a in the end plate 25a and the opposite end received in a similar recess in the top wall of the block 14a in the vertical wall connecting the pathway between the plates 22a and 23a with the inclined side walls 21a.

The structure above described is similar in every respect to the form of the invention shown in Figures 1 to 11 inclusive except that the work pieces are fed to the discharge chute or passageway 19a in such a manner that the small ends will drop therethrough by gravity. In order to accomplish this, the pathway in which the intermittent feed bar 40a operates, is formed with an abrupt end wall connected to the discharge opening 19a so that the work pieces will fall by gravity with their smaller ends foremost through the tapered portion of the discharge opening formed by the inclined walls 21a.

*Description of the operation of the modified form of the invention shown in Figures 12 to 14 inclusive*

The intermittent feed bar 40a is reciprocated in the same manner as pointed out in connection with Figures 1 to 11 inclusive and the work pieces W' are fed downwardly through the chute transversely of the pathway in which said intermittent feed bar operates and pass within the recess or notch 50a in the underside of the intermittent feed bar.

If the work pieces W' enter the pathway from the chute in which they are arranged at random with their smaller ends foremost as shown in Figure 12, the smaller end of the work piece will pass beneath the edge 24a of the plate 22a in the undercut slot thereof. As the intermittent feed bar is fed toward the discharge opening 19a, the work piece will be moved so that its larger end will be supported by the bar 53a so that said work piece will tilt or rock and fall through said discharge opening 19a with its smaller end foremost as indicated in dotted lines in Figure 13.

Should the work pieces W' enter the pathway with their larger ends foremost (Figure 14) they will abut the vertical wall 24a of the plate 22a and assume a position as shown in Figure 14 when they come to rest under the recess or notch 50a. As the intermittent feed bar 40a is moved toward the discharge chute 19a, the large end of the work piece W' will be supported on the bar 53a so that the work piece will fall by gravity with its smaller end foremost through the discharge opening 19a. Thus, the work piece will fall with the smaller end foremost through the discharge passageway 19a regardless of whether it is fed to the pathway from the chute with its large or small end foremost.

It is to be understood that the forms of the invention herewith shown and described are to be taken as preferred embodiments thereof and that various changes may be made in the shape, size and arrangement of parts without departing from the spirit of the invention or the scope of the subjoined claims.

What I claim is:

1. An article handling apparatus for intermittently feeding tapered work pieces, comprising a support having a passageway provided with a vertical discharge opening, means for feeding work pieces transversely of said passageway, work piece moving means in said passageway for transferring work pieces from said feeding means to said discharge opening, and means for positioning said work pieces so that they will be arranged with their larger ends overhanging said discharge opening, whereby said work pieces will fall through said discharge opening in an upright position, said last-named means including a pair of abutting walls for permitting work pieces fed from said feeding means to come to rest relative to the work piece moving means with their smaller ends projecting from the sides of the work piece moving means so that the work piece will be supported at its smaller end when transferred to a position above the discharge opening.

2. An article handling apparatus for intermittently feeding tapered work pieces in an upright position, comprising a support having a passageway provided with an inlet opening and a discharge opening, a feeding device for feeding work pieces to said inlet opening, work piece moving mechanism mounted in said passageway for transferring said work pieces from said inlet opening to said discharge opening, stepped abutments extending along said passageway between said openings, one of said abutments being arranged to engage only the large end of said work piece and to permit the small end of said work piece to pass beyond it into engagement with the other abutment, and ledges on opposite sides transverse of said discharge opening for supporting the smaller end of said workpiece so that the work will drop through said discharge opening with its larger end foremost.

3. An article handling apparatus for work pieces with a low center of gravity, comprising a support having a passageway terminating at one end in a vertical discharge opening, a feeding device for feeding work pieces to said passageway, a plunger having a recess for receiving a work piece from said feeding device and moving the same to said discharge opening, a supporting ledge on each side of the discharge opening, and stepped abutments arranged along one side of said passageway at different distances from the other side thereof for causing said work pieces to arrange themselves in a position so that one end of said work piece will be supported on one of said supporting ledges and drop through said discharge opening with the lower center of gravity end foremost.

4. An article handling apparatus for intermittently feeding tapered work pieces of round section, comprising a support having a passageway provided with a vertical discharge opening, means for feeding work pieces transversely to said passageway, a plunger movably mounted in said passageway having a notch therein for receiving work pieces fed to said passageway for transferring said work pieces to said discharge opening, work piece supporting surfaces on opposite sides of the discharge opening transversely of said passageway, means at one side of said passageway opposite said feeding means for allowing certain of said work pieces to be arranged beneath said notch so that the smaller end of said tapered work piece will be supported on one of said surfaces with the larger end overhanging said discharge opening when transferred from said feeding means to said discharge opening, and abutment means on one side of said passageway opposite said feeding means for engaging the large end of other work pieces and positioning said work piece beneath said notch so that the smaller end will be supported on the other of said supporting surfaces and the larger end will overhang the discharge opening when said work piece is moved by the work piece moving means from the feeding means to said discharge opening.

5. An article handling apparatus for intermittently feeding tapered work pieces of round section, comprising a support having a pair of passageways, a feed plunger mounted in one of said passageways, a reciprocating intermittent feed bar mounted in the other passageway having a notch on the under side thereof, said passageways being connected by a vertical bore forming a discharge opening for one of said passageways for feeding work pieces to said other passageway in the path of said feed plunger, means for feeding work pieces to one of said passageways adjacent said discharge opening and beneath the notch in said feed bar, yielding spring means interconnecting said feed bar and feed plunger, means on one side of said feed bar opposite said work piece feeding means for receiving the smaller end of said work piece so that the large end of said work piece will be positioned over the discharge opening and arranged to be deposited therein when said work piece is transferred from said feeding means to said discharge opening, and abutment means on one side of said passageway opposite said work piece feeding means for engaging the large end of said tapered work piece and positioning the same so that the large end will overhang said discharge opening when the work piece is transferred from the feeding means to the discharge opening, whereby all of the work pieces fed to said feed bar will pass downwardly through said discharge opening with the large end foremost and in an upright position so as to come to rest on the floor of the other passageway in advance of the feed plunger.

6. An article handling apparatus for intermittently feeding tapered work pieces, comprising a support having a work piece receiving passageway provided with a vertical discharge opening, means for feeding work pieces to said passageway whereby said work pieces will be disposed transversely of said passageway, means selectively engageable with the workpieces for intercepting the workpieces at one or the other of a plurality of stations in response to the presentation respectively of the small end or the large end of the workpiece thereto, means movably mounted in said passageway for transferring said work pieces from said feeding means to said discharge opening, and means arranged adjacent said opening for supporting one end of said work piece whereby said work piece will be tilted so that it will fall by gravity through said discharge opening in an upright position.

CHARLES L. HOMMEL.

REFERENCES CITED

The following references are of record in the file of this patent:

UNITED STATES PATENTS

| Number | Name | Date |
|---|---|---|
| 163,151 | Carey | May 11, 1875 |
| 971,999 | Hodge | Oct. 4, 1910 |
| 1,195,571 | Flaherty | Aug. 22, 1916 |
| 1,242,086 | Von Henriquez | Oct. 2, 1917 |
| 1,325,339 | Swazey | Dec. 16, 1919 |
| 1,578,458 | Miller et al. | Mar. 30, 1926 |
| 1,732,283 | Schlaupitz | Oct. 22, 1929 |
| 2,235,084 | Ortegren et al. | Mar. 18, 1941 |
| 2,365,158 | Wallick | Dec. 19, 1944 |
| 2,379,717 | Hurley | July 3, 1945 |

FOREIGN PATENTS

| Number | Country | Date |
|---|---|---|
| 547,501 | Great Britain | Aug. 31, 1942 |